United States Patent
Hou et al.

(10) Patent No.: US 10,877,809 B2
(45) Date of Patent: Dec. 29, 2020

(54) PRELOADING APPLICATIONS FROM A PRIORITY LIST BASED ON MEMORY USAGE STATUS OF AN ELECTRONIC DEVICE

(71) Applicants: Beijing Lenovo Software Ltd., Beijing (CN); Lenovo (Beijing) Limited, Beijing (CN)

(72) Inventors: Wei Hou, Beijing (CN); Jingjing Liu, Beijing (CN)

(73) Assignees: Beijing Lenovo Software Ltd., Beijing (CN); Lenovo (Beijing) Limited, Beijing (CN)

(*) Notice: Subject to any disclaimer, the term of this patent is extended or adjusted under 35 U.S.C. 154(b) by 122 days.

(21) Appl. No.: 14/858,211

(22) Filed: Sep. 18, 2015

(65) Prior Publication Data
US 2016/0364272 A1 Dec. 15, 2016

(30) Foreign Application Priority Data
Jun. 12, 2015 (CN) .......................... 2015 1 0325872

(51) Int. Cl.
G06F 9/50 (2006.01)
G06F 9/48 (2006.01)
G06F 9/445 (2018.01)

(52) U.S. Cl.
CPC ........ *G06F 9/5038* (2013.01); *G06F 9/44578* (2013.01); *G06F 9/485* (2013.01); *G06F 9/5016* (2013.01)

(58) Field of Classification Search
CPC .............................. G06F 9/5016; G06F 9/5038
See application file for complete search history.

(56) References Cited

U.S. PATENT DOCUMENTS

| | | | | |
|---|---|---|---|---|
| 6,182,133 B1* | 1/2001 | Horvitz | ............. | G06F 17/30902 707/999.008 |
| 6,594,731 B1* | 7/2003 | Hertwig | ............. | G06F 12/0862 711/137 |
| 8,291,503 B2* | 10/2012 | Hamid | ............. | G06F 9/44521 712/248 |
| 9,372,716 B1* | 6/2016 | Ramani | ............. | G06F 9/46 |

(Continued)

FOREIGN PATENT DOCUMENTS

| | | |
|---|---|---|
| CN | 102541602 A | 7/2012 |
| CN | 103369508 A | 10/2013 |
| CN | 104598315 A | 5/2015 |

OTHER PUBLICATIONS

"Chinese Application No. 201510325872.X, Office Action dated Aug. 31, 2017", w/ English Translation, (Aug. 31, 2017), 18 pgs.

*Primary Examiner* — Jorge A Chu Joy-Davila
(74) *Attorney, Agent, or Firm* — Schwegman Lundberg & Woessner, P.A.

(57) ABSTRACT

The present disclosure provides a method for information processing. The method is applied in an electronic device and comprises: acquiring, upon detecting that the electronic device has been switched from a first state to a second state, a priority list storing a priority of each application that is initiated by a user among all applications when the electronic device is switched to the first state again; and selecting one or more applications from the priority list for preloading. Also provided is an apparatus for information processing.

14 Claims, 4 Drawing Sheets

(56) References Cited

U.S. PATENT DOCUMENTS

| Publication No. | Date | Name | Classification | Subclass |
|---|---|---|---|---|
| 2006/0129494 A1* | 6/2006 | Kim | G06F 8/60 | 705/57 |
| 2009/0113444 A1* | 4/2009 | Hackborn | G06F 9/461 | 719/312 |
| 2010/0202278 A1* | 8/2010 | Ikeda | G11B 20/10 | 369/275.3 |
| 2010/0313002 A1 | 12/2010 | Hamid | | |
| 2011/0145362 A1* | 6/2011 | Jones | H04L 67/1008 | 709/217 |
| 2012/0047509 A1* | 2/2012 | Ben-Itzhak | G06F 9/50 | 718/103 |
| 2012/0167122 A1* | 6/2012 | Koskimies | G06F 9/5027 | 719/328 |
| 2012/0206418 A1* | 8/2012 | Bi | G06F 3/03545 | 345/179 |
| 2013/0007662 A1* | 1/2013 | Bank | G06F 9/451 | 715/811 |
| 2013/0054929 A1* | 2/2013 | Baik | G06F 12/126 | 711/170 |
| 2013/0124673 A1* | 5/2013 | Hjelm | G06F 8/00 | 709/217 |
| 2014/0149920 A1* | 5/2014 | Wang | G06F 3/0482 | 715/783 |
| 2014/0269469 A1* | 9/2014 | Tran | H04W 52/0254 | 370/311 |
| 2015/0026415 A1* | 1/2015 | Clausen | G06F 12/0862 | 711/137 |
| 2015/0195789 A1* | 7/2015 | Yoon | G06F 3/0488 | 345/173 |
| 2015/0245160 A1* | 8/2015 | Agrawal | H04M 15/8044 | 455/406 |
| 2015/0347488 A1* | 12/2015 | Peters | G06F 3/04817 | 715/765 |
| 2016/0150096 A1* | 5/2016 | Chen | H04M 19/042 | 455/418 |
| 2016/0232578 A1* | 8/2016 | Jung | G06Q 30/0267 | |

\* cited by examiner

US 10,877,809 B2

PRELOADING APPLICATIONS FROM A PRIORITY LIST BASED ON MEMORY USAGE STATUS OF AN ELECTRONIC DEVICE

CROSS-REFERENCE TO RELATED APPLICATION(S)

This application claims priority to the Chinese Patent Application No. 201510325872.X, filed on Jun. 12, 2015, entitled "METHOD AND APPARATUS FOR INFORMATION PROCESSING" which is incorporated herein by reference in its entirety.

TECHNICAL FIELD

The present disclosure relates to information processing technology, and more particularly, to a method and an apparatus for information processing.

BACKGROUND

Currently, electronic devices, particularly mobile phones, tablet computers and laptop computers, have been widely applied in people's daily lives. Most of the electronic devices, such as those having Android systems, can support multiple applications and allow more than one application to run simultaneously.

Generally, if an electronic device is executing more than one application while in a screen-on state, when the electronic device is switched to a screen-off state and has insufficient memory, its system typically determines priorities of the applications according to their running statuses (e.g., foreground vs. background) and then releases the resources occupied by applications having low priorities. However, an application having a low priority may not be an application unusually used by a user. When the electronic device is switched to the screen-on state again, the user may want to use the released application again. In this case, the electronic device's responding time to the application would be increased.

SUMMARY

In view of this, an object of the present disclosure is to provide a method and an apparatus for information processing, capable of improving user experience by preloading applications based on the user's usage custom.

According to an embodiment of the present disclosure, a method for information processing is provided. The method is applied in an electronic device and comprises: acquiring, upon detecting that the electronic device has been switched from a first state to a second state, a priority list storing a priority of each application that is initiated by a user among all applications when the electronic device is switched to the first state again; and selecting one or more applications from the priority list for preloading.

In an embodiment, the step of acquiring the priority list comprises: sorting priorities of all the applications in accordance with a predetermined strategy; and generating the priority list by selecting one or more applications satisfying a first predetermined condition based on a result of the sorting.

In an embodiment, the step of sorting priorities of all the applications in accordance with the predetermined strategy comprises: acquiring current usage behavior information of the user for all the applications, wherein the current usage behavior information includes at least one or more of: application initiation time, application execution time and application execution progress; acquiring historical usage behavior information of the user for all the applications; analyzing the current usage behavior information for all the application with reference to the historical usage behavior information for all the applications; and determining the priorities of all the applications based on a result of the analyzing.

In an embodiment, the step of acquiring the historical usage behavior information of the user for all the applications comprises: reading from a memory or acquiring from a second device connected to the electronic device the historical usage behavior information of the user for all the applications.

In an embodiment, the step of selecting one or more applications from the priority list for preloading comprises: preloading one or more applications in the priority list that has a priority satisfying a second predetermined condition based on a system memory state.

In an embodiment, the step of preloading one or more applications in the priority list that has a priority satisfying a second predetermined condition based on a system memory state comprises: determining a number, M, of applications to be preloaded based on a memory usage condition of the system, where M is a positive integer; selecting applications having the highest M priorities from the priority list; and preloading the applications having the highest M priorities.

In an embodiment, the method further comprises: detecting periodically whether resources occupied by any of the applications having the highest M priorities have been released by the system or not; and preloading the released application, if any, again.

In an embodiment, the method further comprises: when the electronic device has been switched from the second state to the first state: initiating a first application on basis that the first application has been preloaded, in response to receiving a request for initiating the first application, wherein the first application is an application in the priority list that has been preloaded.

In an embodiment, the method further comprises: recording usage behavior information of the user for all the applications when the electronic device is switched to the first state again; and analyzing and updating historical usage behavior information of the user for all the applications based on the usage behavior information of the user for all the applications when the electronic device is switched to the first state again.

According to another embodiment of the present disclosure, an apparatus for information processing is provided. The apparatus comprises: an acquiring module configured to acquire, upon detecting that the electronic device has been switched from a first state to a second state, a priority list storing a priority of each application that is initiated by a user among all applications when the electronic device is switched to the first state again; and a first processing module configured to select one or more applications from the priority list for preloading.

In an embodiment, the acquiring module is further configured to: sort priorities of all the applications in accordance with a predetermined strategy; and generate the priority list by selecting one or more applications satisfying a first predetermined condition based on a result of the sorting.

In an embodiment, the acquiring module is further configured to: acquire current usage behavior information of the user for all the applications, wherein the current usage behavior information includes at least one or more of: application initiation time, application execution time and application execution progress; acquire historical usage behavior information of the user for all the applications; analyze the current usage behavior information for all the application with reference to the historical usage behavior information for all the applications; and determine the priorities of all the applications based on a result of the analyzing.

In an embodiment, the acquiring module is further configured to: read from a memory or acquire from a second device connected to the electronic device the historical usage behavior information of the user for all the applications.

In an embodiment, the first processing module is further configured to: preload one or more applications in the priority list that has a priority satisfying a second predetermined condition based on a system memory state.

In an embodiment, the first processing module is further configured to: determine a number, M, of applications to be preloaded based on a memory usage condition of the system, where M is a positive integer; select the applications having the highest M priorities from the priority list; and preload the applications having the highest M priorities.

In an embodiment, the first processing module is further configured to: detect periodically whether resources occupied by any of the applications having the highest M priorities have been released by the system or not; and preload the released application, if any, again.

In an embodiment, the apparatus further comprises: a second processing module configured to initiate, when the electronic device has been switched from the second state to the first state, a first application on basis that the first application has been preloaded in response to receiving a request for initiating the first application. The first application is an application in the priority list that has been preloaded.

In an embodiment, the apparatus further comprises: an updating module configured to: record usage behavior information of the user for all the applications when the electronic device is switched to the first state again; and analyze and update historical usage behavior information of the user for all the applications based on the usage behavior information of the user for all the applications when the electronic device is switched to the first state again.

DETAILED DESCRIPTION OF THE EMBODIMENTS

In the following, the present disclosure will be explained in detail with reference to the figures, such that the features and technical contents of the present disclosure can be better understood. The figures are illustrative only and are not intended to limit the present disclosure.

First Embodiment

Figure 1:
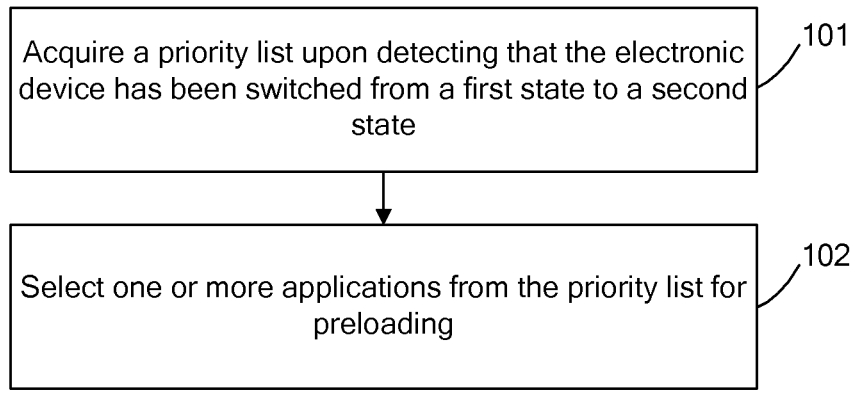
FIG. 1 is a first flowchart illustrating a method for information processing according to an embodiment of the present disclosure.

FIG. 1 is a first flowchart illustrating a method for information processing according to an embodiment of the present disclosure. The method is applied in an electronic device. In a preferred embodiment, the method mainly includes the following steps.

At step 101, a priority list is acquired upon detecting that the electronic device has been switched from a first state to a second state.

Here, the priority list stores a priority of each application that is initiated by a user among all applications when the electronic device is switched to the first state again.

In this embodiment, all the applications include applications provided by the system of the electronic device, such as clock application and contact application, and third-party applications installed by the user, such as game applications, instant messaging applications and mail applications.

In particular, the first state can be a screen-on state and the second state can be a screen-off state.

Preferably, the step of acquiring the priority list can include: sorting priorities of all the applications in accordance with a predetermined strategy; and generating the priority list by selecting one or more applications satisfying a first predetermined condition based on a result of the sorting.

Preferably, the step of sorting priorities of all the applications in accordance with the predetermined strategy can include: acquiring current usage behavior information of the user for all the applications; acquiring historical usage behavior information of the user for all the applications; analyzing the current usage behavior information for all the application with reference to the historical usage behavior information for all the applications; and determining the priorities of all the applications based on a result of the analyzing.

Here, the current usage behavior information can include at least one or more of: application initiation time, application execution time and application execution progress Preferably, the step acquiring the historical usage behavior information of the user for all the applications can include: reading from a memory or acquiring from a second device connected to the electronic device the historical usage behavior information of the user for all the applications.

That is, the historical usage behavior information for all the applications can be stored in a local memory of the electronic device or in a second device. Here, the second device can be a server.

Here, the first predetermined condition can be the priority of the application belonging to the highest x % among all the applications, where x is a positive value.

Alternatively, the first predetermined condition can be the priority of the application belonging to the highest N priorities among all the applications, where N is a positive integer.

It is to be noted here that the first predetermined condition is not limited to those listed above and can be set depending on actual implementations. Further examples of the first predetermined condition will be omitted here.

That is, the applications stored in the priority list may not necessarily be all the applications in the electronic device. Rather, they can be applications usually used by the user, such as news client application, WeChat application or QQ application.

At step 102, one or more applications are selected from the priority list for preloading.

Preferably, the step of selecting one or more applications from the priority list for preloading can include preloading one or more applications in the priority list that has a priority satisfying a second predetermined condition based on a system memory state.

Preferably, the step of preloading one or more applications in the priority list that has a priority satisfying a second predetermined condition based on a system memory state can include: determining a number, M, of applications to be preloaded based on a memory usage condition of the system, where M is a positive integer; selecting applications having the highest M priorities from the priority list; and preloading the applications having the highest M priorities.

Preferably, the step of preloading the applications having the highest M priorities can include: detecting periodically whether resources occupied by any of the applications having the highest M priorities have been released by the system or not; and preloading the released application, if any, again.

In this embodiment, the electronic device can be a mobile phone, a tablet computer, a television, a laptop computer or a wearable device.

For example, the electronic device records the applications initiated by the user each time it is in the screen-on state and analyzes the priority of each of the applications based on the recording results. Then, when the electronic device is in the screen-off state, the applications having high priorities can be preloaded, such that, when the user selects those applications, the user's selection can be quickly responded to. Hence, it is possible to improve the user experience.

According to this embodiment of the present disclosure, a priority list is acquired upon detecting that the electronic device has been switched from a first state to a second state. The priority stores a priority of each application that is initiated by a user among all applications when the electronic device is switched to the first state again. One or more applications from the priority list are selected for preloading. In this way, it is possible to improve user experience by preloading applications based on the user's usage custom.

Second Embodiment

Figure 2:
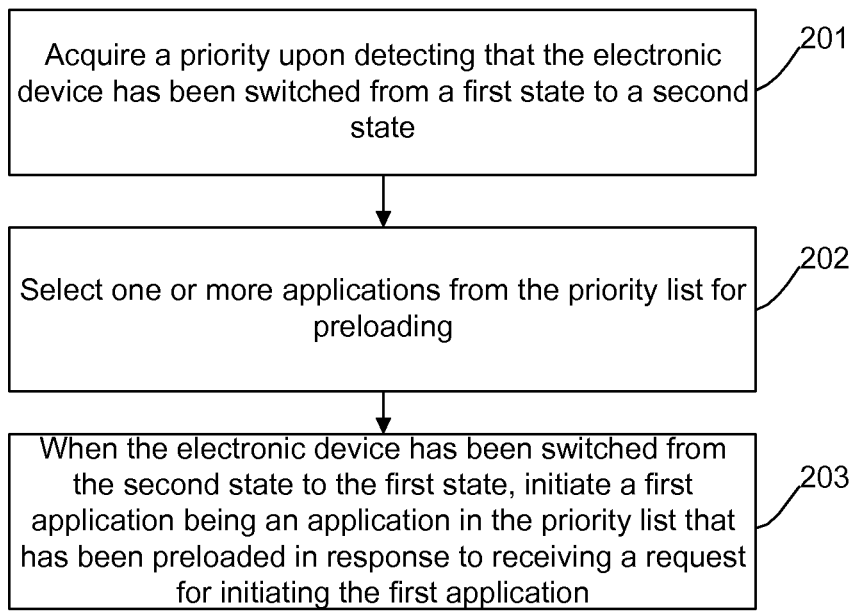
FIG. 2 is a second flowchart illustrating a method for information processing according to an embodiment of the present disclosure.

FIG. 2 is a second flowchart illustrating a method for information processing according to an embodiment of the present disclosure. The method is applied in an electronic device. In a preferred embodiment, the method mainly includes the following steps.

At step 201, a priority list is acquired upon detecting that the electronic device has been switched from a first state to a second state.

Here, the priority list stores a priority of each application that is initiated by a user among all applications when the electronic device is switched to the first state again.

In this embodiment, all the applications include applications provided by the system of the electronic device, such as clock application and contact application, and third-party applications installed by the user, such as game applications, instant messaging applications and mail applications.

In particular, the first state can be a screen-on state and the second state can be a screen-off state.

Preferably, the step of acquiring the priority list can include: sorting priorities of all the applications in accordance with a predetermined strategy; and generating the priority list by selecting one or more applications satisfying a first predetermined condition based on a result of the sorting.

Preferably, the step of sorting priorities of all the applications in accordance with the predetermined strategy can include: acquiring current usage behavior information of the user for all the applications; acquiring historical usage behavior information of the user for all the applications; analyzing the current usage behavior information for all the application with reference to the historical usage behavior information for all the applications; and determining the priorities of all the applications based on a result of the analyzing.

For example, the user may initiate two applications B and C when the electronic device is in the first state. In this case, when the electronic device is in the second state, the acquired historical priorities can be A>B>C>D. Then, when the priority list is determined, the result of the sorting can be B>C>A>D.

Here, the current usage behavior information can include at least one or more of: application initiation time, application execution time and application execution progress Preferably, the step of acquiring the historical usage behavior information of the user for all the applications can include: reading from a memory or acquiring from a second device connected to the electronic device the historical usage behavior information of the user for all the applications.

That is, the historical usage behavior information for all the applications can be stored in a local memory of the electronic device or in a second device. Here, the second device can be a server.

Here, the first predetermined condition can be the priority of the application belonging to the highest x % among all the applications, where x is a positive value.

Alternatively, the first predetermined condition can be the priority of the application belonging to the highest N priorities among all the applications, where N is a positive integer.

It is to be noted here that the first predetermined condition is not limited to those listed above and can be set depending on actual implementations. Further examples of the first predetermined condition will be omitted here.

That is, the applications stored in the priority list may not necessarily be all the applications in the electronic device. Rather, they can be applications usually used by the user, such as news client application, WeChat application or QQ application.

At step 202, one or more applications are selected from the priority list for preloading.

Preferably, the step of selecting one or more applications from the priority list for preloading can include preloading one or more applications in the priority list that has a priority satisfying a second predetermined condition based on a system memory state.

Preferably, the step of preloading one or more applications in the priority list that has a priority satisfying a second predetermined condition based on a system memory state can include: determining a number, M, of applications to be preloaded based on a memory usage condition of the system, where M is a positive integer; selecting applications having the highest M priorities from the priority list; and preloading the applications having the highest M priorities.

Preferably, the step of preloading the applications having the highest M priorities can include: detecting periodically whether resources occupied by any of the applications having the highest M priorities have been released by the system or not; and preloading the released application, if any, again.

At step 203, when the electronic device has been switched from the second state to the first state, a first application is initiated on basis that the first application has been preloaded in response to receiving a request for initiating the first application. The first application is an application in the priority list that has been preloaded.

As such, the speed at which the electronic device responds to the first application can be increased, thereby improving the user experience significantly.

For example, a recording result for the electronic device may indicate that the user typically initiates a news client application from 1 p.m. to 2 p.m. Then, when the priorities are determined, the news client application will have a high priority. Hence, from 1 p.m. to 2 p.m., the electronic device will preload the news client application, such that news contents can be presented to the user quickly when the user initiates the news client application.

According to this embodiment of the present disclosure, a priority list is acquired upon detecting that the electronic device has been switched from a first state to a second state. The priority stores a priority of each application that is initiated by a user among all applications when the electronic device is switched to the first state again. One or more applications from the priority list are selected for preloading. When the electronic device has been switched from the second state to the first state, a first application is initiated on basis that the first application has been preloaded in response to receiving a request for initiating the first application. The first application is an application in the priority list that has been preloaded. In this way, it is possible to improve user experience by preloading applications based on the user's usage custom, e.g., when the user initiates a first application, the first application can be quickly responded to.

Third Embodiment

Figure 3:
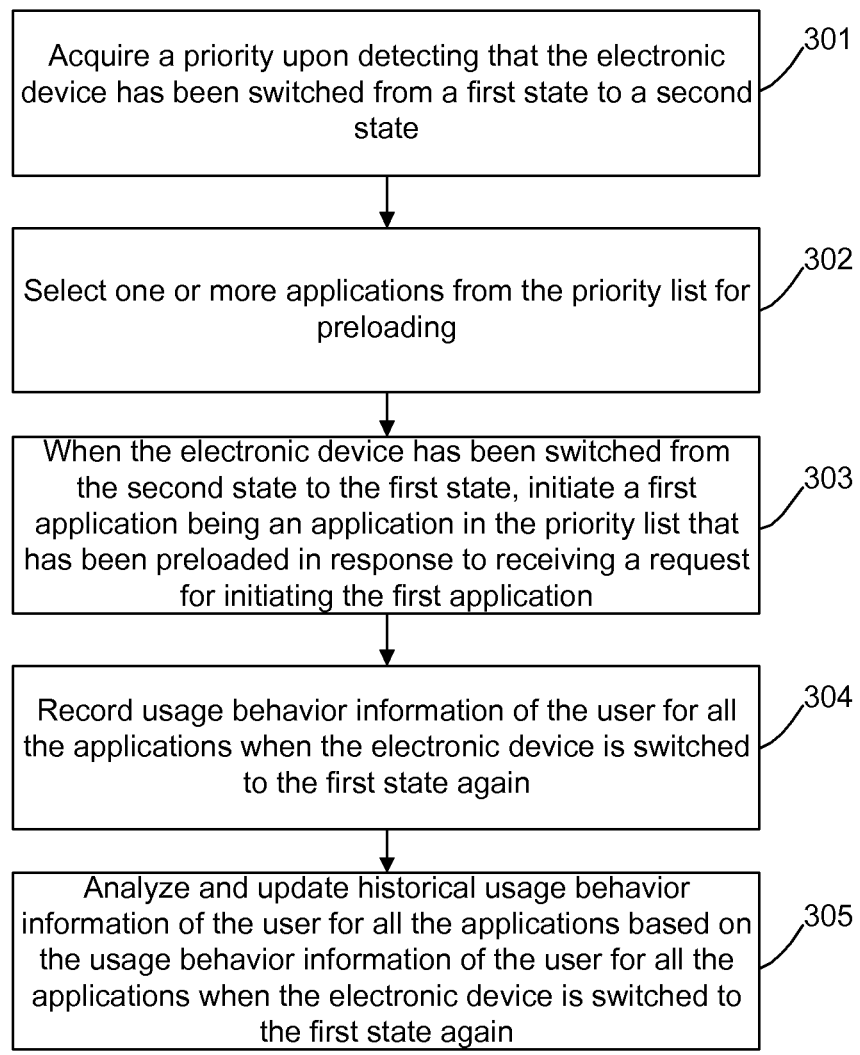
FIG. 3 is a third flowchart illustrating a method for information processing according to an embodiment of the present disclosure.

FIG. 3 is a third flowchart illustrating a method for information processing according to an embodiment of the present disclosure. The method is applied in an electronic device. In a preferred embodiment, the method mainly includes the following steps.

At step 301, a priority list is acquired upon detecting that the electronic device has been switched from a first state to a second state.

Here, the priority list stores a priority of each application that is initiated by a user among all applications when the electronic device is switched to the first state again.

In this embodiment, all the applications include applications provided by the system of the electronic device, such as clock application and contact application, and third-party applications installed by the user, such as game applications, instant messaging applications and mail applications.

In particular, the first state can be a screen-on state and the second state can be a screen-off state.

Preferably, the step of acquiring the priority list can include: sorting priorities of all the applications in accordance with a predetermined strategy; and generating the priority list by selecting one or more applications satisfying a first predetermined condition based on a result of the sorting.

Preferably, the step of sorting priorities of all the applications in accordance with the predetermined strategy can include: acquiring current usage behavior information of the user for all the applications; acquiring historical usage behavior information of the user for all the applications; analyzing the current usage behavior information for all the application with reference to the historical usage behavior information for all the applications; and determining the priorities of all the applications based on a result of the analyzing.

Here, the current usage behavior information can include at least one or more of: application initiation time, application execution time and application execution progress Preferably, the step acquiring the historical usage behavior information of the user for all the applications can include: reading from a memory or acquiring from a second device connected to the electronic device the historical usage behavior information of the user for all the applications.

That is, the historical usage behavior information for all the applications can be stored in a local memory of the electronic device or in a second device. Here, the second device can be a server.

Here, the first predetermined condition can be the priority of the application belonging to the highest x % among all the applications, where x is a positive value.

Alternatively, the first predetermined condition can be the priority of the application belonging to the highest N priorities among all the applications, where N is a positive integer.

It is to be noted here that the first predetermined condition is not limited to those listed above and can be set depending on actual implementations. Further examples of the first predetermined condition will be omitted here.

That is, the applications stored in the priority list may not necessarily be all the applications in the electronic device. Rather, they can be applications usually used by the user, such as news client application, WeChat application or QQ application.

At step 302, one or more applications are selected from the priority list for preloading.

Preferably, the step of selecting one or more applications from the priority list for preloading can include preloading one or more applications in the priority list that has a priority satisfying a second predetermined condition based on a system memory state.

Preferably, the step of preloading one or more applications in the priority list that has a priority satisfying a second predetermined condition based on a system memory state can include: determining a number, M, of applications to be preloaded based on a memory usage condition of the system, where M is a positive integer; selecting applications having the highest M priorities from the priority list; and preloading the applications having the highest M priorities.

Preferably, the step of preloading the applications having the highest M priorities can include: detecting periodically whether resources occupied by any of the applications having the highest M priorities have been released by the system or not; and preloading the released application, if any, again.

At step 303, when the electronic device has been switched from the second state to the first state, a first application is initiated on basis that the first application has been preloaded in response to receiving a request for initiating the first application. The first application is an application in the priority list that has been preloaded.

At step 304, usage behavior information of the user for all the applications when the electronic device is switched to the first state again is recorded.

At step 305, historical usage behavior information of the user for all the applications is analyzed and updated based on the usage behavior information of the user for all the applications when the electronic device is switched to the first state again.

With the steps 304-305, the usage of the applications by the user each time the electronic device is in the first state can be recorded and analyzed timely, which facilitates acquiring the priority list accurately in the step 301 and improves the user experience significantly.

For example, the user viewed a stock application usually in January and February, viewed the stock application occasionally in March, and did not view the stock application in early April and was addicted to a game b application. Accordingly, the electronic device no longer preloads the stock application in the screen-off state and set the priority of the game b application to a high level. Since the user's usage behavior information for each application each time is recorded and analyzed, it is possible to better determine whether the user's custom has changed or not and better adapt to the change in the user's custom.

In this embodiment, the electronic device can be a mobile phone, a tablet computer, a television, a laptop computer or a wearable device.

According to this embodiment of the present disclosure, when the electronic device has been switched from the second state to the first state, a first application is initiated on basis that the first application has been preloaded in response to receiving a request for initiating the first application. The first application is an application in the priority list that has been preloaded. Usage behavior information of the user for all the applications when the electronic device is switched to the first state again is recorded. Historical usage behavior information of the user for all the applications is analyzed and updated based on the usage behavior information of the user for all the applications when the electronic device is switched to the first state again. In this way, it is possible to preload an application based on the user's custom in using the application. For example, when the user initiates a first application, the first application can be quickly responded to. Further, the usage of the applications by the user each time the electronic device is in the first state can be recorded and analyzed timely, which facilitates acquiring the priority list accurately and improves the user experience significantly.

Fourth Embodiment

Figure 4:
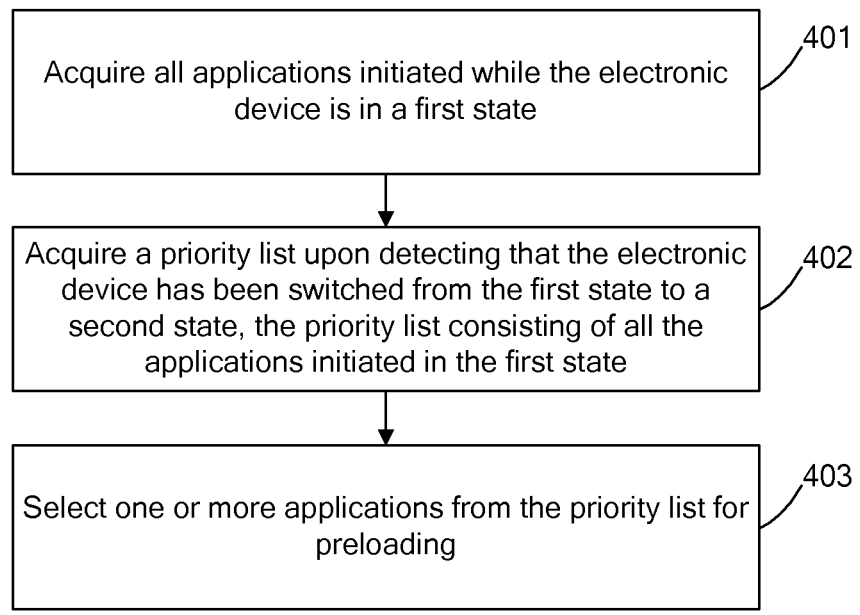
FIG. 4 is a fourth flowchart illustrating a method for information processing according to an embodiment of the present disclosure.

FIG. 4 is a fourth flowchart illustrating a method for information processing according to an embodiment of the present disclosure. The method is applied in an electronic device. In a preferred embodiment, the method mainly includes the following steps.

At step 401, all applications initiated while the electronic device is in a first state are acquired.

Here the first state can be a screen-on state.

At step 402, a priority list is acquired upon detecting that the electronic device has been switched from the first state to a second state. The priority list consists of all the applications initiated in the first state.

Here the second state can be a screen-off state.

Here, the priority list stores a priority of each application that is initiated by a user among all applications when the electronic device is switched to the first state again.

In this embodiment, all the applications include applications provided by the system of the electronic device, such as clock application and contact application, and third-party applications installed by the user, such as game applications, instant messaging applications and mail applications.

Preferably, the step of acquiring the priority list can include: sorting priorities of all the applications initiated while the electronic device is in the first state in accordance with a predetermined strategy; and generating the priority list based on a result of the sorting.

Preferably, the step of sorting priorities of all the applications initiated while the electronic device is in the first state in accordance with the predetermined strategy can include: acquiring current usage behavior information of the user for all the applications; acquiring historical usage behavior information of the user for all the applications; analyzing the current usage behavior information for all the application with reference to the historical usage behavior information for all the applications; and determining the priorities of all the applications based on a result of the analyzing.

Here, the current usage behavior information can include at least one or more of: application initiation time, application execution time and application execution progress Preferably, the step acquiring the historical usage behavior information of the user for all the applications can include: reading from a memory or acquiring from a second device connected to the electronic device the historical usage behavior information of the user for all the applications initiated in the first state.

That is, the historical usage behavior information for all the applications initiated in the first state can be stored in a local memory of the electronic device or in a second device. Here, the second device can be a server.

At step 403, one or more applications are selected from the priority list for preloading.

Preferably, the step of selecting one or more applications from the priority list for preloading can include preloading one or more applications in the priority list that has a priority satisfying a second predetermined condition based on a system memory state.

Preferably, the step of preloading one or more applications in the priority list that has a priority satisfying a second predetermined condition based on a system memory state can include: determining a number, M, of applications to be preloaded based on a memory usage condition of the system, where M is a positive integer; selecting applications having the highest M priorities from the priority list; and preloading the applications having the highest M priorities.

Preferably, the step of preloading the applications having the highest M priorities can include: detecting periodically whether resources occupied by any of the applications having the highest M priorities have been released by the system or not; and preloading the released application, if any, again.

For example, the user initiates five applications A, B, C, D, E and F while the electronic device is in the first state. Then, when the priority list is acquired while the electronic device is in the second state, only these five applications are analyzed, i.e., the priorities of these five applications are sorted. When there is insufficient system memory, only one or more of these five applications that have high priorities will be preloaded. When there is sufficient system memory, all of the five applications can be preloaded. In this way, only the applications previously initiated in the electronic device will be preloaded. It is possible to avoid preloading other applications, thereby saving the system memory.

In this embodiment, the electronic device can be a mobile phone, a tablet computer, a television, a laptop computer or a wearable device.

According to this embodiment of the present disclosure, all applications initiated while the electronic device is in a first state are acquired. A priority list is acquired upon detecting that the electronic device has been switched from the first state to a second state. The priority list consists of all the applications initiated in the first state. One or more applications are selected from the priority list for preloading. In this way, it is possible to preload an application based on the user's custom in using the application. Only some or all of the applications previously initiated in the electronic device will be preloaded. It is possible to avoid preloading other applications, thereby saving the system memory and improving the user experience significantly.

Fifth Embodiment

Figure 5:
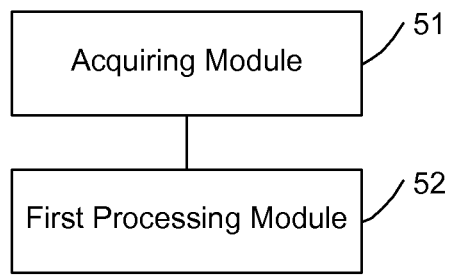
FIG. 5 is a first schematic diagram showing a structure of an apparatus for information processing according to an embodiment of the present disclosure.

FIG. 5 is a first schematic diagram showing a structure of an apparatus for information processing according to an embodiment of the present disclosure. As shown in FIG. 5, the apparatus includes an acquiring module 51 configured to acquire, upon detecting that the electronic device has been switched from a first state to a second state, a priority list storing a priority of each application that is initiated by a user among all applications when the electronic device is switched to the first state again.

The apparatus further includes a first processing module 52 configured to select one or more applications from the priority list for preloading.

Preferably, the acquiring module 51 is further configured to: sort priorities of all the applications in accordance with a predetermined strategy; and generate the priority list by selecting one or more applications satisfying a first predetermined condition based on a result of the sorting.

Preferably, the acquiring module 51 is further configured to: acquire current usage behavior information of the user for all the applications, wherein the current usage behavior information includes at least one or more of: application initiation time, application execution time and application execution progress; acquire historical usage behavior information of the user for all the applications; analyze the current usage behavior information for all the application with reference to the historical usage behavior information for all the applications; and determine the priorities of all the applications based on a result of the analyzing.

Preferably, the acquiring module 51 is further configured to: read from a memory or acquire from a second device connected to the electronic device the historical usage behavior information of the user for all the applications.

Preferably, the first processing module 52 is further configured to: preload one or more applications in the priority list that has a priority satisfying a second predetermined condition based on a system memory state.

Preferably, the first processing module 52 is further configured to: determine a number, M, of applications to be preloaded based on a memory usage condition of the system, where M is a positive integer; select the applications having the highest M priorities from the priority list; and preload the applications having the highest M priorities.

Preferably, the first processing module 52 is further configured to: detect periodically whether resources occupied by any of the applications having the highest M priorities have been released by the system or not; and preload the released application, if any, again.

With the apparatus for information processing according to this embodiment, it is possible to improve user experience by preloading applications based on the user's custom in using the applications.

It can be appreciated by those skilled in the art that the functions of the respective modules in the apparatus for information processing can be understood by referring to the above description of the method for information processing. The respective modules in the apparatus for information processing can be implemented by analog circuits performing the functions described in this embodiment, or by software running on a smart terminal and performing the functions described in this embodiment.

Sixth Embodiment

Figure 6:
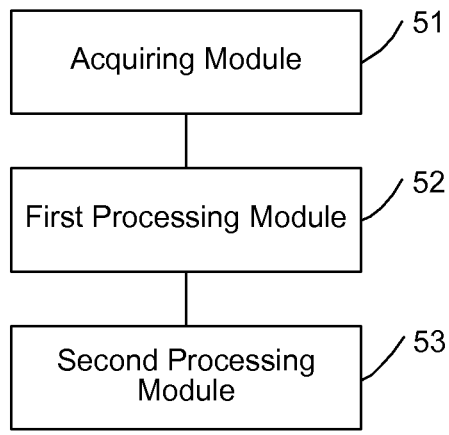
FIG. 6 is a second schematic diagram showing a structure of an apparatus for information processing according to an embodiment of the present disclosure.

FIG. 6 is a second schematic diagram showing a structure of an apparatus for information processing according to an embodiment of the present disclosure. As shown in FIG. 6, the apparatus includes an acquiring module 51 configured to acquire, upon detecting that the electronic device has been switched from a first state to a second state, a priority list storing a priority of each application that is initiated by a user among all applications when the electronic device is switched to the first state again.

The apparatus further includes a first processing module 52 configured to select one or more applications from the priority list for preloading.

The apparatus further includes a second processing module 53 configured to initiate, when the electronic device has been switched from the second state to the first state, a first application on basis that the first application has been preloaded in response to receiving a request for initiating the first application. The first application is an application in the priority list that has been preloaded.

Preferably, the acquiring module 51 is further configured to: sort priorities of all the applications in accordance with a predetermined strategy; and generate the priority list by selecting one or more applications satisfying a first predetermined condition based on a result of the sorting.

Preferably, the acquiring module 51 is further configured to: acquire current usage behavior information of the user for all the applications, wherein the current usage behavior information includes at least one or more of: application initiation time, application execution time and application execution progress; acquire historical usage behavior information of the user for all the applications; analyze the current usage behavior information for all the application with reference to the historical usage behavior information for all the applications; and determine the priorities of all the applications based on a result of the analyzing.

Preferably, the acquiring module 51 is further configured to: read from a memory or acquire from a second device connected to the electronic device the historical usage behavior information of the user for all the applications.

Preferably, the first processing module 52 is further configured to: preload one or more applications in the priority list that has a priority satisfying a second predetermined condition based on a system memory state.

Preferably, the first processing module 52 is further configured to: determine a number, M, of applications to be preloaded based on a memory usage condition of the system, where M is a positive integer; select the applications having the highest M priorities from the priority list; and preload the applications having the highest M priorities.

Preferably, the first processing module 52 is further configured to: detect periodically whether resources occupied by any of the applications having the highest M priorities have been released by the system or not; and preload the released application, if any, again.

With the apparatus for information processing according to this embodiment, it is possible to improve user experience by preloading applications based on the user's custom in using the applications, e.g., when the user initiates a first application, the first application can be quickly responded to.

It can be appreciated by those skilled in the art that the functions of the respective modules in the apparatus for information processing can be understood by referring to the above description of the method for information processing. The respective modules in the apparatus for information processing can be implemented by analog circuits performing the functions described in this embodiment, or by software running on a smart terminal and performing the functions described in this embodiment.

Seventh Embodiment

Figure 7:
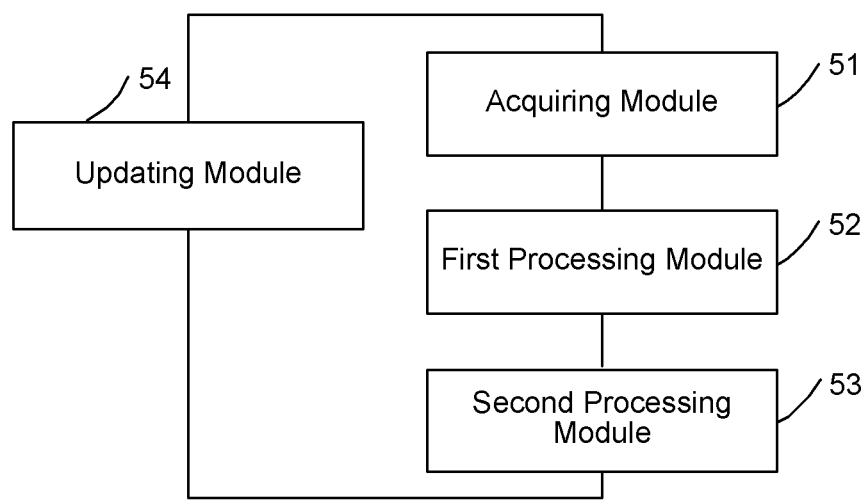
FIG. 7 is a third schematic diagram showing a structure of an apparatus for information processing according to an embodiment of the present disclosure.

FIG. 7 is a third schematic diagram showing a structure of an apparatus for information processing according to an embodiment of the present disclosure. As shown in FIG. 7, the apparatus includes an acquiring module 51 configured to acquire, upon detecting that the electronic device has been switched from a first state to a second state, a priority list storing a priority of each application that is initiated by a user among all applications when the electronic device is switched to the first state again.

The apparatus further includes a first processing module 52 configured to select one or more applications from the priority list for preloading.

The apparatus further includes a second processing module 53 configured to initiate, when the electronic device has been switched from the second state to the first state, a first application on basis that the first application has been preloaded in response to receiving a request for initiating the first application. The first application is an application in the priority list that has been preloaded.

The apparatus further includes an updating module 54 configured to: record usage behavior information of the user for all the applications when the electronic device is switched to the first state again; and analyze and update historical usage behavior information of the user for all the applications based on the usage behavior information of the user for all the applications when the electronic device is switched to the first state again.

Preferably, the acquiring module 51 is further configured to: sort priorities of all the applications in accordance with a predetermined strategy; and generate the priority list by selecting one or more applications satisfying a first predetermined condition based on a result of the sorting.

Preferably, the acquiring module 51 is further configured to: acquire current usage behavior information of the user for all the applications, wherein the current usage behavior information includes at least one or more of: application initiation time, application execution time and application execution progress; acquire historical usage behavior information of the user for all the applications; analyze the current usage behavior information for all the application with reference to the historical usage behavior information for all the applications; and determine the priorities of all the applications based on a result of the analyzing.

Preferably, the acquiring module 51 is further configured to: read from a memory or acquire from a second device connected to the electronic device the historical usage behavior information of the user for all the applications.

Preferably, the first processing module 52 is further configured to: preload one or more applications in the priority list that has a priority satisfying a second predetermined condition based on a system memory state.

Preferably, the first processing module 52 is further configured to: determine a number, M, of applications to be preloaded based on a memory usage condition of the system, where M is a positive integer; select the applications having the highest M priorities from the priority list; and preload the applications having the highest M priorities.

Preferably, the first processing module 52 is further configured to: detect periodically whether resources occupied by any of the applications having the highest M priorities have been released by the system or not; and preload the released application, if any, again.

With the apparatus for information processing according to this embodiment, the usage of the applications by the user each time the electronic device is in the first state can be recorded and analyzed timely, which facilitates acquiring the priority list accurately and improves the user experience significantly.

It can be appreciated by those skilled in the art that the functions of the respective modules in the apparatus for information processing can be understood by referring to the above description of the method for information processing. The respective modules in the apparatus for information processing can be implemented by analog circuits performing the functions described in this embodiment, or by software running on a smart terminal and performing the functions described in this embodiment.

In practice, the acquiring module 51, the first processing module 52, the second processing module 53 and the updating module 54 in the apparatus for information processing according to this embodiment can be implemented by a Central Processing Unit (CPU), Digital Signal Processor (DSP) or Field Programmable Gate Array (FPGA) in the apparatus or in the electronic device to which the apparatus belongs.

It can be appreciated from the embodiments of the present disclosure that the disclosed device and method can be implemented in alternative ways. The device embodiments as described above are illustrative only. For example, while the modules have been divided in accordance with their logical functions, other divisions are possible in practice. For example, more than one module or element can be combined or can be integrated into another system, or some features can be ignored or omitted. In addition, the coupling, direct coupling or communicative connection between various components as shown or discussed can be an indirect coupling or communicative connection via some interface, device or module and can be electrical, mechanical or in another form.

The modules described above as separated may or may not be physically separated. The components shown as modules may or may not be physical modules. They can be co-located or can be distributed over a number of network elements. Depending on actual requirements, some or all of the modules can be selected to achieve the object of the present disclosure.

Further, all the functional modules in various embodiments of the present disclosure can be integrated within one processing unit, or each of these modules can be a separate module, or two or more modules can be integrated into one module. Such integrated module can be implemented in hardware, possibly in combination with software functional modules.

It can be appreciated by those skilled in the art that some or all of the steps in the method embodiments as described above can be implemented by hardware following instructions of a program. Such program can be stored in a computer readable storage medium and, when executed, performs the steps of the above method embodiments. The storage medium may be any of various mediums capable of storing program codes, such as a mobile storage device, a Read Only Memory (ROM), a Random Access Memory (RAM), a magnetic disk or an optical disc.

Alternatively, when the above integrated modules of the present disclosure are implemented in software functional modules and sold or used as a standalone product, they can be stored in a computer readable storage medium. In view of this, the technical solutions according to the embodiments of the present disclosure, or in other words a part thereof which makes contribution over the prior art, can be substantially embodied in a form of software product. The computer software product can be stored in a storage medium, such as ROM/RAM, magnetic disk, optical disc and the like, containing instructions which cause a computer device (which can be a personal computer, a server, a network device or the like) to perform one or more methods according to the embodiments of the present disclosure or particular parts thereof. The storage medium may be any of various mediums capable of storing program codes, such as a mobile storage device, a ROM, a RAM, a magnetic disk or an optical disc.

While the embodiments of the present disclosure have been described above, the scope of the present disclosure is not limited thereto. Various modifications and alternatives can be made by those skilled in the art without departing from the scope of the present disclosure. These modifications and alternatives are to be encompassed by the scope of the present disclosure which is only defined by the claims as attached.

What is claimed is:

1. A method for information processing, applied in an electronic device, the method comprising:
   acquiring, by the electronic device, information regarding applications initiated while the electronic device is in a screen-on state;
   acquiring, by the electronic device, upon detecting that the electronic device has been switched from the screen-on state to a screen-off state, a priority list, and wherein the priority list stores a priority of each application initiated while the electronic device was in the screen-on state and applications to be initiated by a user when the electronic device is switched from the screen-off state to the screen-on state to run on a system of the electronic device among all applications installed on the electronic device;
   wherein the acquiring the priority list comprises:
      acquiring current usage behavior information related to the user's current use of all the applications, wherein the current usage behavior information includes at least one or more of application initiation time, application execution time and application execution progress;
      acquiring historical usage behavior information related to the user's historical use of all the applications and historical priorities of all the applications, wherein the historical priorities of all the applications are determined at a previous switching of the electronic device from the screen-on state to a screen-off state;
      analyzing the current usage behavior information for all the applications with reference to the historical usage behavior information for all the applications and the historical priorities of all the applications;
      determining the priorities of all the applications based on a result of the analyzing of all the application and the historical priorities of all the applications;
      sorting priorities of all the applications; and
      generating the priority list by selecting a first predetermined number of applications having the highest priorities among all the applications, based on a result of the sorting;
   selecting, by the electronic device, a subset of the first predetermined number of applications to preload based on an updated memory state of the system of the electronic device;
   preloading, by the electronic device, the subset of the first predetermined number of applications; and
   initiating, by the electronic device, one or more preloaded applications of the subset of the first predetermined number of applications in response to receiving a request for initiating the one or more applications by a user when the electronic device is switched from the screen-off state to the screen-on state.

2. The method of claim 1, wherein said acquiring the historical usage behavior information of the user for all the applications comprises: reading from a memory or acquiring from a second device connected to the electronic device the historical usage behavior information of the user for all the applications.

3. The method of claim 1, wherein said selecting one or more applications from the priority list for preloading comprises: preloading a second predetermined number of applications in the priority list that have the highest priorities, based on a system memory state.

4. The method of claim 3, wherein said preloading a second predetermined number of applications in the priority list that have the highest priorities based on a system memory state comprises: determining a number of applications to be preloaded based on a memory usage condition of the system of the electronic device as the second predetermined number; selecting the second predetermined number of applications having the highest priorities from the priority list; and preloading the second predetermined number of applications having the highest priorities.

5. The method of claim 4, further comprising: detecting periodically whether resources occupied by any of the second predetermined number of applications having the highest priorities have been released by the system of the electronic device or not; and preloading the released application again, if any.

6. The method of claim 1, further comprising: when the electronic device has been switched from the screen-off state to the screen-on state:
   initiating a first application on basis that the first application has been preloaded in response to receiving a request for initiating the first application, wherein the first application is an application in the priority list that has been preloaded.

7. The method of claim 1, further comprising: recording usage behavior information of the user for all the applications when the electronic device is switched to the screen-on state again; and analyzing and updating historical usage behavior information of the user for all the applications based on the usage behavior information of the user for all the applications when the electronic device is switched to the screen-on state again.

8. An electronic device, comprising:
a processor, and
a memory including instructions which, when executed by the processor, cause the processor to:
acquire, information regarding applications initiated while the electronic device is in a screen-on state and upon detecting that the electronic device has been switched from the screen-on state to a screen-off state, a priority list, wherein the priority list stores a priority of each application to be initiated by a user when the electronic device is switched from the screen-off state to the screen-on state again to run on a system of the electronic device among all applications installed on the electronic device; and
wherein the memory further includes instructions which, when executed by the processor, cause the processor to:
acquire current usage behavior information related to the user's current use of all the applications, wherein the current use behavior information includes at least one or more of application initiation time, application execution time and application execution progress;
acquire historical usage behavior information related to the user's historical use of all the applications and historical priorities of all the applications, wherein the historical priorities of all the applications are determined at a previous switching of the electronic device from the screen-on state to a screen-off state;
analyze the current usage behavior information for all the applications with reference to the historical usage behavior information for all the applications and the historical priorities of all the applications;
determine the priorities of all the applications based on a result of the analyzing of all the applications and the historical priorities of all the applications; sort priorities of all the applications; and
generate the priority list by selecting a first predetermined number of applications having the highest priorities among all the applications, based on a result of the sorting;
select a subset of the first predetermined number of applications to preload based on an updated memory state of the system of the electronic device;
preload the subset of the first predetermined number of applications; and
initiate one or more preloaded applications of the subset of the first predetermined number of applications in response to receiving a request for initiating the one or more applications by a user when the electronic device is switched from the screen-off state to the screen-on state.

9. The electronic device of claim 8, wherein the memory further includes instructions which, when executed by the processor, cause the processor to: read from a memory or acquire from a second device connected to the electronic device the historical usage behavior information of the user for all the applications.

10. The electronic device of claim 8, wherein the memory further includes instructions which, when executed by the processor, cause the processor to: preload a second predetermined number of applications in the priority list that have the highest priorities, based on a system memory state.

11. The electronic device of claim 10, wherein the memory further includes instructions which, when executed by the processor, cause the processor to: determine a number of applications to be preloaded based on a memory usage condition of the system of the electronic device as the second predetermined number; select the second predetermined number of applications having the highest priorities from the priority list; and preload the second predetermined number of applications having the highest priorities.

12. The electronic device of claim 11, wherein the memory further includes instructions which, when executed by the processor, cause the processor to: detect periodically whether resources occupied by any of the second predetermined number of applications having the highest priorities have been released by the system of the electronic device or not; and preload the released application again, if any.

13. The electronic device of claim 8, wherein the memory further includes instructions which, when executed by the processor, cause the processor to: initiate, when the electronic device has been switched from the screen-off state to the screen-on state, a first application on basis that the first application has been preloaded in response to receiving a request for initiating the first application, wherein the first application is an application in the priority list that has been preloaded.

14. The electronic device of claim 8, wherein the memory further includes instructions which, when executed by the processor, cause the processor to: record usage behavior information of the user for all the applications when the electronic device is switched to the screen-on state again; and analyze and update historical usage behavior information of the user for all the applications based on the usage behavior information of the user for all the applications when the electronic device is switched to the screen-on state again.

* * * * *